(12) United States Patent
Boes et al.

(10) Patent No.: US 9,200,691 B2
(45) Date of Patent: Dec. 1, 2015

(54) COUPLING MEMBER AND MULTIPLE POINT CONNECTION

(75) Inventors: Sebastian Boes, Brachttal (DE); Joerg Ditzel, Freigericht (DE)

(73) Assignee: Anvis Deutschland GmbH, Steinau an der Straße (DE)

( * ) Notice: Subject to any disclaimer, the term of this patent is extended or adjusted under 35 U.S.C. 154(b) by 542 days.

(21) Appl. No.: 13/236,344

(22) Filed: Sep. 19, 2011

(65) Prior Publication Data

US 2012/0067681 A1  Mar. 22, 2012

(30) Foreign Application Priority Data

Sep. 21, 2010  (DE) .......................... 10 2010 046 118

(51) Int. Cl.
| | |
|---|---|
| F16F 7/104 | (2006.01) |
| F16F 7/108 | (2006.01) |
| F16M 13/00 | (2006.01) |
| F16F 15/04 | (2006.01) |
| F16F 1/373 | (2006.01) |
| F16F 1/393 | (2006.01) |

(52) U.S. Cl.
CPC ............... F16F 7/108 (2013.01); *F16F 1/3732* (2013.01); *F16F 1/3935* (2013.01); *F16F 15/04* (2013.01)

(58) Field of Classification Search
CPC ....... F16F 1/373; F16F 1/3732; F16F 1/3735; F16F 1/38; F16F 1/3828; F16F 1/3842; F16F 1/387; F16F 1/393; F16F 1/3935; F16F 1/41; F16F 15/04; F16F 15/08; B62K 21/08; F16C 27/00
USPC ................ 267/136, 141, 141.2, 141.3, 141.7; 188/378, 380; 248/560, 562, 636, 638
See application file for complete search history.

(56) References Cited

U.S. PATENT DOCUMENTS

| | | | | |
|---|---|---|---|---|
| 3,101,938 | A | * | 8/1963 | Hirst ............................... 267/25 |
| 3,171,622 | A | * | 3/1965 | Tolan, Jr. ....................... 248/635 |
| 3,588,008 | A | * | 6/1971 | Wyman ......................... 248/635 |
| 4,895,354 | A | * | 1/1990 | Byrnes ........................ 267/141.1 |
| 5,024,464 | A | * | 6/1991 | Kawaguchi et al. ........... 280/731 |
| 5,127,698 | A | | 7/1992 | Konig |
| 6,354,578 | B1 | | 3/2002 | Nakatsukasa |
| 6,464,247 | B1 | | 10/2002 | Laue |
| 6,698,733 | B1 | * | 3/2004 | Larmande ...................... 267/293 |
| 8,474,804 | B2 | * | 7/2013 | Masterson et al. ............. 267/141 |
| 2003/0085499 | A1 | * | 5/2003 | Bucksbee ................... 267/141.3 |
| 2004/0026908 | A1 | | 2/2004 | Schneider et al. |
| 2005/0056509 | A1 | * | 3/2005 | Ishino ............................ 188/378 |
| 2011/0272870 | A1 | * | 11/2011 | Akagawa et al. .............. 267/141 |

FOREIGN PATENT DOCUMENTS

| | | |
|---|---|---|
| CN | 1069232 C | 8/2001 |
| DE | 4335510 A1 | 5/1994 |

(Continued)

*Primary Examiner* — Melody Burch
(74) *Attorney, Agent, or Firm* — Dennis J. Williamson; Moore & Van Allen PLLC

(57) ABSTRACT

For an elastic coupling member for a three (or more) point connection of a vibration absorber mass, like a gas generator for an airbag, to a motor vehicle part exposed to vibrations or oscillations, like a steering wheel structure, comprising a sleeve-shaped spring body firmly connectable to the vibration absorber mass and the motor vehicle part and having an axial direction, it is provided that the spring body has a different shape in its first radial sectional plane, in particular a vertical radial sectional plane, compared to a second, in particular horizontal radial section plane circumferentially offset from the first one.

19 Claims, 1 Drawing Sheet

(56) References Cited

FOREIGN PATENT DOCUMENTS

| | | | |
|---|---|---|---|
| DE | 10226092 A1 | | 1/2004 |
| DE | 102008039936 A1 | * | 3/2010 |
| EP | 0204330 A2 | * | 12/1986 |
| EP | 0412864 A1 | | 2/1991 |
| JP | 446230 A2 | * | 2/1992 |
| JP | 670428 A | * | 3/1994 |
| JP | 6137354 A | * | 5/1994 |

* cited by examiner

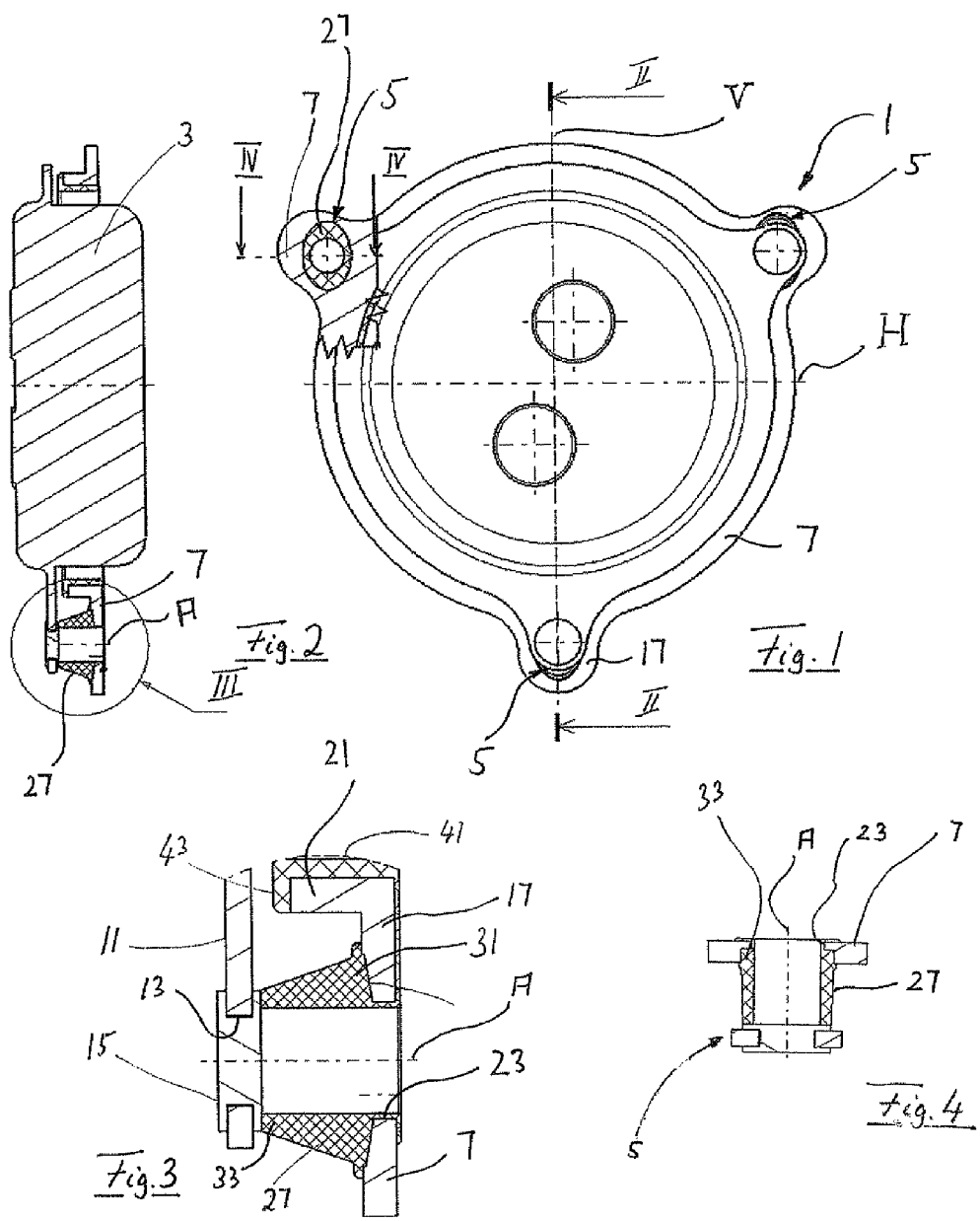

COUPLING MEMBER AND MULTIPLE POINT CONNECTION

CROSS-REFERENCE TO RELATED APPLICATION

This application claims priority benefits under 35 U.S.C. §119(a) to German Patent Application No. DE 102010046118.0, entitled "Coupling Member for a Three (or More) Point Connection and Three (or More) Point Connection," and filed Sep. 21, 2010, the contents of which are incorporated by reference in their entirety.

BACKGROUND

The invention relates to an elastic coupling member that may be used as a plurality of such members, for example as an arrangement of three identical, elastic individual coupling members, for the fixation of a vibration absorbing mass, like a gas generator for an airbag, to a motor vehicle part exposed to oscillations and/or vibrations, like a steering wheel structure.

An elastic coupling member for a group arrangement is known for example from DE 102 26 092 A1. A fixation means like a buttoning element or a rivet head is fixed at the respective ends of a cylindrical, sleeve-shaped spring body, in order to positively attach the vibration absorbing mass to the motor vehicle part via the spring body.

Generally, the vibration absorber serves the purpose of annihilating resonance vibrations of the motor vehicle part, in particular the steering column and the steering wheel through counter vibrations of the mass. At the same time, it must be assured that upon triggering the airbag, the generated gas flow is directed to the airbag for its inflation, which usually is realised by means of activated elastomer abutments.

The vibration absorption system of the above, known type assures a vibration absorption in a particular vibration excitation direction. However, it became apparent that for different driving situations and vibration load states different vibration resonance states must be born at the vehicle part elastically coupled to the absorbing mass.

SUMMARY

It is an objective of the invention, to overcome the disadvantages of the prior art, in particular to provide an elastic coupling member for a three (or more) point connection as well as a three (or more) point connection with which a desired, attuned vibration absorption with respect to the motor vehicle part can be realised for a wide range of excitation vibration loads in different excitation directions.

This objective is achieved by the features of claim 1.

Accordingly, the elastic coupling member for the three (or more) point connection has a spring body in a sleeve shape that defines an axial direction. Commonly, in the mounted state of the coupling member and following the complete fitting of the three (or more) point connection, the axial direction coincides with the horizontal direction. According to the invention, the sleeve-shaped body is shaped differently in a first, in particular vertical radial section plane compared to a second radial section plane that is circumferentially offset with respect to the first one and preferably horizontal, and that is different in particular in such a way that in particular different resonance frequencies in different radial directions can be annihilated and thus compensated by the same absorption mass. It became apparent that with the coupling member according to the invention and the associated three (or more) point connection of the invention, the spring rigidity of the absorption system can be adjusted in a load-specific manner in at least two spatial axes, yet also in a third, fourth, etc. radial section plane by means of respective particular shaping, in order to operationally act in an absorbing manner upon excitations in different spatial axes. Practice has shown that often especially two or more excitations occur in different spatial axes. Therein it can be distinguished between a main excitation in a vertical direction and an auxiliary excitation in a horizontal direction. Both excitations have different frequencies and/or deviating amplitudes. Through the measure of the invention of shaping the sleeve-shaped spring body differently dependent on the respective excitation direction, the oscillating behaviour of the absorption mass can be attuned according to the expected excitation and its direction. Only the targeted attunement of the absorber according to the invention based on two spring stiffnesses, deviating in the two radial directions, both excitations, for example in vertical and horizontal direction can be effectively absorbed.

Further characteristics, advantages and features of the invention are specified in the dependent claims.

In a preferred embodiment of the invention a radial stiffness of the spring body is increased or decreased in direction of the first radial section plane compared to the second radial section plane by means of a wall thickness of the sleeve-shaped spring body being larger or smaller in the first section plane than in the second radial section plane. Therein, the wall thickness may decrease or increase from the larger to the smaller dimension or vice versa, respectively.

In a further embodiment of the invention, the spring body has a wall thickness in the first radial section plane that increases, in particular continuously, in axial direction. Preferably, the spring body is shaped at least partially conical, i.e. conical in this particular radial section plane. In the second radial section plane the spring body may have a constant wall thickness, wherein the spring body is in particular shaped partially cylindrical in the second radial section plane. In this respect, the minimum wall thickness of the first radial section plane may be essentially equal to the constant wall thickness of the second radial section plane. Therein, the partial conicity comprises a maximum angle of inclination in the first radial section plane, wherein the partial conicity gradually decreases from the first radial section plane in circumferential direction in order to disappear in particular towards the cylindrical portion of the radial section.

In a preferred embodiment of the invention, a spring body is shaped axially symmetrically with respect to the first and the second radial section plane. Alternatively, or additionally, the first and the second radial section plane are circumferentially offset by about 90°.

In a further development of the invention an inner circumferential side of the spring body is shaped cylindrically, wherein in particular an outer circumferential side of the spring body is to its largest part shaped by a truncated cone-shaped surface. The angle of inclination of the truncated cone-shaped surface may decrease in both circumferential directions around the axial direction from a maximum according to the first radial section plane and in particular disappear towards the cylindrical section in order to increase again towards the maximum.

In a preferred embodiment of the invention, the spring body has an annular circular inner side and an essentially elliptical outer side in an axial section plane. In axial direction, the elliptical outer side may gradually merge into an annular circular outer side. Alternatively or additionally, the spring body may have point-symmetrical cone shapes with a large axial end facing the motor vehicle and a narrow axial end facing the absorber mass. Despite of the point symmetry the spring body may have an axial symmetry.

In a further development of the invention, a fixation means like a rivet head, a detent means, a weldable material, a buttoning, a glued connection or the like is fixed at an in particular narrow end of the spring body, by means of which the spring body is firmly attachable to the absorber mass.

The invention also relates to a three (or more)-point connection of a vibration absorber mass like a gas generator for an airbag, at a motor vehicle part exposed to vibrations and/or oscillations, like a steering wheel structure, with three or more elastic coupling members according to the invention. At the side of the motor vehicle part the three (or more) point connection has a support ring, at the circumference of which the coupling members are firmly attached in a distributed manner at an in particular constant circumferential distance or preferably 120°, 90°, 60°, depending on the number, in particular vulcanised with or without an adhesive, overmoulded, at least partially, preferably completely, or fixed without vulcanising agent.

In a preferred embodiment of the invention, the coupling members are shaped identically, wherein in particular the first and second radial section plane of the coupling members are arranged in parallel to each other.

In an alternative embodiment, the individual elastic coupling members can be connected to each other through formation of a solid ring body designed to facilitate the assembly of the coupling members by being made of one piece. The coupling member ring is a closed circular structure and preferably without corners.

In a further development of the invention, the support ring has circumferential spring abutments, preferably in all oscillation directions that are preferably made of the same material as the spring body, for example rubber or an elastomer material. Alternatively or additionally thereto the support ring may have a passage for each coupling member, the boundary rim of which is preferably completely covered by the material of the spring body. The circumferential annular surface of the delimiting area of the passage facing the spring body is reclined with respect to the radial direction, in particular the vertical direction, by an angle that is essentially equal or slightly smaller than a maximum angle of inclination of a conical outer side of the spring body. The circumferential annular surface of the spring body is parallel to the radial direction in the second radial sectional plane.

BRIEF DESCRIPTION OF THE DRAWINGS

Further characteristics, advantages and features of the invention are explained in the following description of a preferred embodiment of the invention in conjunction with the enclosed drawings, representing:

FIG. 1 a top view of a three-point connection with a gas generator as absorption mass;

FIG. 2 a cross sectional view of the three-point connection along the section line II-II in FIG. 1;

FIG. 3 an enlarged cross sectional view of the details area III in FIG. 2; and

FIG. 4 an enlarged cross sectional view according to the section line IV-IV in FIG. 1 according to the enlarged representation according to FIG. 3.

DETAILED DESCRIPTION

FIG. 1 shows a top view of an elastic three-point connection 1 of an absorption mass 3 at a motor vehicle body not represented in detail. At least three essentially identical individual coupling members 5 are provided for the three-point connection, elastically attaching the absorption mass, like a gas generator for an airbag module, to a support ring 7 at the vehicle body.

The absorption mass 3 comprises an annular flange 11 designed with three bores 13 in which a fixation means 15 of the individual coupling member engages attachingly. The fixation means 15 is designed as a rivet head in the example shown in the figures. However, other fixation means, like buttonings, welding connections, etc. may be used.

The support ring 7 has an L-shaped cross section, wherein in the area of the three-point connection a vertical leg 17 of the "L" is distinctly longer than a horizontal leg 21. A passage 23 is provided within the larger vertical leg 17 and opposite the opening 13, aligned with the latter and overmoulded for connecting the elastic individual coupling member of elastomer material, precisely a spring body 27 of the individual coupling member 5. This will be explained in more detail later.

In an alternative fixation of the spring body at the annular flange a rivet head may be unnecessary when using buttoning, wherein in place of the rivet head the spring body is enlarged with undercuttings for buttoning.

The individual coupling member 5 comprises the sleeve-shaped spring body 27, having a truncated cone shape in a radial cross sectional view in vertical direction as shown in FIG. 2, the truncated cone shape being also visible in FIG. 3. The truncated cone shape has a larger end base 31 facing the support ring 7 and being attached thereon. The narrow end 33 of the truncated cone shape is firmly attached to the fixation means 15.

As evident from FIG. 1, the wall thickness of the sleeve of the spring body decreases in circumferential direction starting from a maximum in the vertical radial direction and assumes a minimum in the horizontal radial section plane shown in FIG. 4. There the cross section of the sleeve-shaped spring body 27 comprises an essentially cylindrical shape.

As evident in FIGS. 3 and 4, the end 33 at the side of the support ring is attached by overmoulding to the passage 23 of the support ring, wherein vertical and horizontal elastomer abutments 41, 43 are provided in order to form a flow channel that guides gas generated by the gas generator 3 towards the air bag (not represented).

The design of the individual coupling member according to the invention provides a vibration attunement of the three-point connection by means of which different resonances for excitations in vertical and horizontal direction can be annihilated with one and the same absorber mass connection. The radial stiffness is significantly larger in vertical direction than in horizontal direction.

The features disclosed in the above description, the figures and the claims may be relevant for the realisation of the invention in its different embodiments individually as well as in any combination.

LIST OF REFERENCE NUMERALS 1 elastic three-point connection
3 absorption mass
5 coupling member
7 support ring
11 annular flange
13 bores
15 fixation means
17 vertical leg
21 horizontal leg
23 passage
27 spring body 31 end basis
33 narrow end
41, 43 elastomer abutment
A axial direction
H horizontal direction
V vertikal direction

What is claimed is:

1. An elastic coupling member for a three or more point connection of a vibration absorber mass, the vibration absorber mass being a gas generator for an airbag, to a motor vehicle part exposed to vibrations or oscillations, the motor vehicle part being a steering wheel structure, the coupling member comprising a sleeve-shaped spring body firmly connectable to the vibration absorber mass and the motor vehicle part and having an axial direction, wherein the spring body has a different shape in its first radial sectional plane compared to a second radial sectional plane circumferentially offset from the first radial sectional plane, wherein the spring body has an inner circumferential side and an outer circumferential side, wherein the inner circumferential side of the spring body is shaped cylindrically, wherein the outer circumferential side of the spring body is to its largest part formed by a truncated cone-shaped surface, wherein an angle of inclination of the truncated cone-shaped surface decreases in both circumferential directions around the axial direction from a maximum according to the first radial section plane, disappearing towards a cylindrical section to increase again towards the maximum.

2. The coupling member according to claim 1, wherein the sleeve-shaped spring body has a radial stiffness and a wall thickness, wherein the radial stiffness of the spring body is increased or decreased in the direction of the first radial sectional plane compared to the second radial section plane by means of the wall thickness of the sleeve-shaped spring body being larger or smaller in the first radial sectional plane than in the second radial sectional plane.

3. The coupling member according to claim 1, wherein the spring body has a wall thickness in the first radial section plane that increases in the axial direction, while having a constant wall thickness in the second radial section plane.

4. The coupling member according to claim 1, wherein the spring body is configured (a) to be shaped axially symmetrically with respect to the first and the second radial section planes and differently in each of the planes, (b) such that the first and second radial section planes are circumferentially offset by 90°, or (c) to be shaped axially symmetrically with respect to the first and the second radial section planes and differently in each of the planes and the first and second radial section planes are circumferentially offset by 90°.

5. The coupling member according to claim 1, wherein the spring body is configured to have (a) an annular circular inner side and an essentially elliptical outer side in an axial section plane, wherein in the axial direction the elliptical outer side gradually merges into an annular circular outer side at an axial end of the spring body at the side of the vibration absorber mass, (b) a point-symmetrical truncated cone shape with a large axial end facing the motor vehicle and a narrow axial end facing the absorber mass, or (c) an annular circular inner side and an essentially outer side in an axial section lane wherein in the axial direction the elliptical outer side gradually merges into an annular circular outer side at an axial end of the spring body at the side of the absorber, and a point-symmetrical truncated cone shape with a large axial end facing the motor vehicle and a narrow axial end facing the absorber mass.

6. The coupling member according to claim 1, wherein a fixation means is fixed at a narrow end of the spring body, wherein the spring body is configured to be firmly attached to the vibration absorber mass.

7. A three or more point connection apparatus for connection of a vibration absorber mass, the vibration absorber mass being a gas generator for an airbag, to a motor vehicle part exposed to vibrations or oscillations, the motor vehicle part being a steering wheel structure, with three or more coupling members each comprising a sleeve-shaped spring body, wherein each spring body has a different shape in its first radial sectional plane compared to a second radial sectional plane circumferentially offset from the first radial sectional plane, wherein the spring body has an inner circumferential side and an outer circumferential side, wherein the inner circumferential side of the spring body is shaped cylindrically, wherein the outer circumferential side of the spring body is to its largest part formed by a truncated cone-shaped surface, wherein an angle of inclination of the truncated cone-shaped surface decreases in both circumferential directions around the axial direction from a maximum according to the first radial section plane, disappearing towards a cylindrical section to increase again towards the maximum, the connection apparatus comprising a support ring facing the motor vehicle part at the circumference of which the coupling members are firmly attached in a distributed manner at a constant circumferential distance.

8. The connection apparatus according to claim 7, wherein the coupling members are shaped identically, and wherein the first radial section plane of each coupling member is arranged in parallel with the first radial section plane of each of the other coupling members and the second radial section plane of each coupling member is arranged in parallel with the second radial section plane of each of the other coupling members.

9. The connection apparatus according to claim 7, wherein the support ring (a) has a passage for each coupling member, the passage having a boundary rim that is covered by the material of the spring body, wherein a circumferential annular surface of a delimiting area of the passage facing the spring body is reclined with respect to the radial direction by an angle, that is essentially equal to or smaller than a maximum angle of inclination of the conical outer side of the spring body, or (b) has circumferential spring abutments and has a passage for each coupling member, the passage having a boundary rim that is covered by the material of the spring body, wherein the circumferential annular surface of the delimiting area of the passage facing the spring body is reclined with respect to the radial direction by an angle, that is essentially equal to or smaller than a maximum angle of inclination of the conical outer side of the spring body.

10. The coupling member according to claim 6, wherein the fixation means comprises a rivet head, a detent means, or weldable material.

11. The connection apparatus according to claim 7, wherein the constant circumferential distance is 120°, 90°, or 60°, depending on the number of coupling members.

12. The connection apparatus according to claim 7, wherein the coupling members are firmly attached by being vulcanized with or without an adhesive, at least partially overmolded, or fixed without a vulcanizing agent.

13. The connection apparatus according to claim 7, wherein the coupling members are firmly attached by being completely overmolded.

14. The connection apparatus according to claim 9, wherein the support ring has circumferential spring abutments in all oscillation directions.

15. The connection apparatus according to claim 9, wherein the circumferential spring abutments are made of the same material as the spring body.

16. The connection apparatus according to claim 9, wherein the spring body and the circumferential spring abutments comprise rubber or another elastomer material.

17. The coupling member according to claim 3, wherein, the minimum wall thickness of the first radial section plane is essentially equal to the constant wall thickness of the second radial section plane, and wherein the conicity radially decreases in a circumferential direction from a maximum angle of inclination in the first radial section plane, disappearing while becoming cylindrical.

18. The coupling member according to claim 1, wherein the first radial sectional plane is a vertical radial sectional plane, and wherein the second radial sectional plane is a horizontal radial sectional plane.

19. An elastic coupling member for a three or more point connection of a vibration absorber mass to a motor vehicle part exposed to vibrations or oscillations, the coupling member comprising a sleeve-shaped spring body firmly connectable to the vibration absorber mass and the motor vehicle part and having an axial direction, wherein the spring body has a different shape in its first radial sectional plane compared to a second radial sectional plane circumferentially offset from the first radial sectional plane, wherein the spring body has an inner circumferential side and an outer circumferential side, wherein the inner circumferential side of the spring body is shaped cylindrically, wherein the outer circumferential side of the spring body is to its largest part formed by a truncated cone-shaped surface, wherein an angle of inclination of the truncated cone-shaped surface decreases in both circumferential directions around the axial direction from a maximum according to the first radial section plane, disappearing towards a cylindrical section to increase again towards the maximum, wherein a circumferential annular surface of the spring body for contacting a support ring is reclined with respect to the radial direction in the first radial sectional plane by an angle that is essentially equal to or smaller than a maximum angle of inclination of the conical outer side of the spring body, and wherein the circumferential annular surface of the spring body is parallel to the radial direction in the second radial sectional plane.

\* \* \* \* \*